Feb. 4, 1930.   C. L. PAULUS ET AL   1,745,909
FIRE EXTINGUISHER FOR AIRCRAFT
Filed March 2, 1928
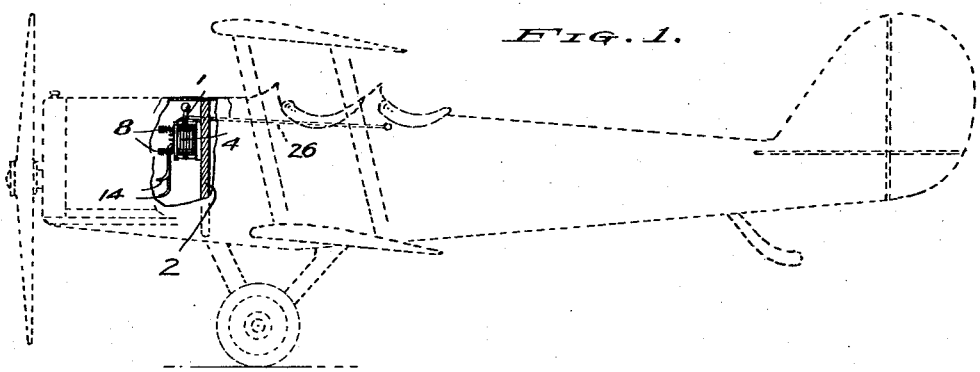
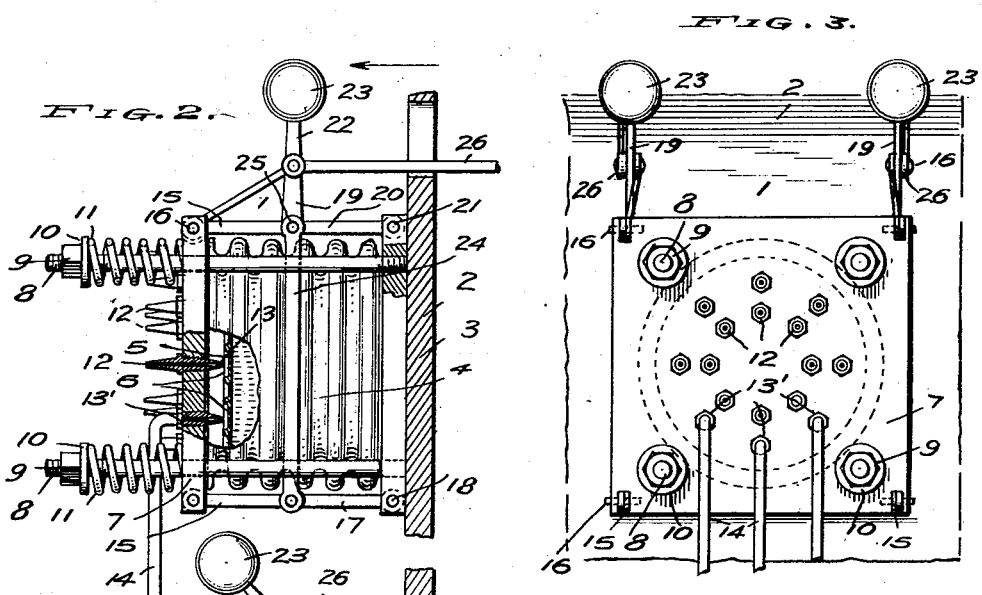
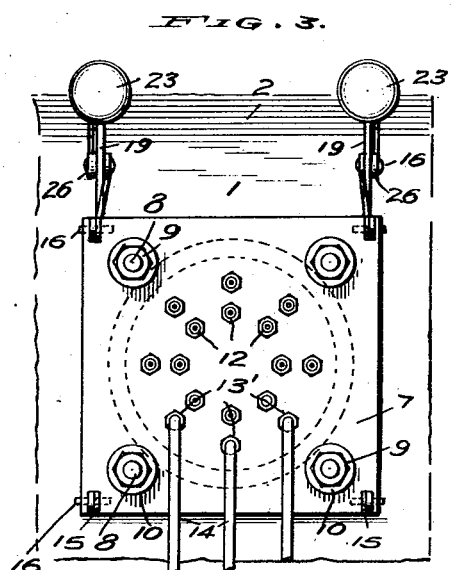
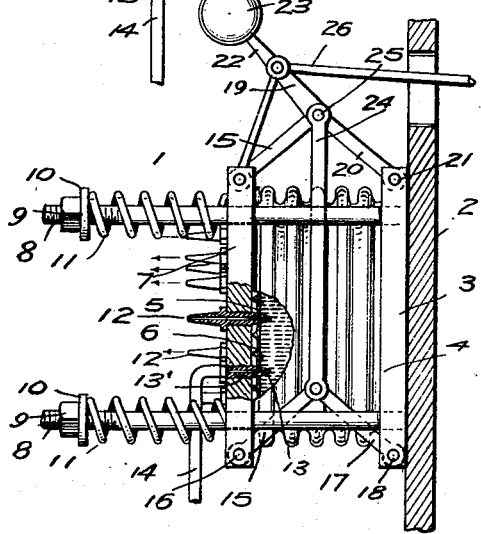
INVENTORS
Charles L. Paulus
Robert Kauch
BY Robert H. Young
ATTORNEY Patented Feb. 4, 1930

1,745,909

UNITED STATES PATENT OFFICE

CHARLES L. PAULUS AND ROBERT KAUCH, OF DAYTON, OHIO

FIRE EXTINGUISHER FOR AIRCRAFT

Application filed March 2, 1928. Serial No. 258,585.

This invention relates to a fire extinguishing system for aircraft and the like, and has for its object to provide a device of this class which will automatically operate in the event of a bad landing or crash, and which may also be manually operated by the pilot in the air or upon the ground whenever occasion requires.

With this object in view, the invention consists of the novel construction of the system and in certain details of construction and combination of parts, all of which will be first fully described and afterwards specifically pointed out in the appended claims.

Referring to the accompanying drawing:

Figure 1 is a diagrammatic view of an airplane in dotted lines and illustrating this system in operative position in side elevation;

Figure 2 is a side elevation of the device;

Figure 3 is a front elevation of the same; and

Figure 4 is a side elevation illustrating the device in active operation.

Like numerals of reference indicate the same parts throughout the several figures in which:

1 indicates the device and 2 is the fire-wall of the aircraft. Positioned on the said fire-wall is the base plate 3, upon which is located the collapsible fire-extinguishing fluid receptacle 4, which includes a front diaphragm 5 having therein a series of readily puncturable sections 6.

7 indicates the front plate of the device, between which plate and the base 3, the collapsible container is confined. The side wall of the container 4 extends sufficiently beyond the diaphragm 5 to space the plate 7 from the diaphragm 5; thus preventing the jet nozzles hereinafter more particularly described from piercing the diaphragm in inoperative position. A series of bolts 8 threaded in the base 3 extend through the said front plate 7. These bolts are provided with nuts 9 and washers 10, confining springs 11, which exert pressure upon the front plate 7 in the direction of the diaphragm 5 of the container 4.

Disposed in the said front plate 7 is a series of jet nozzles 12 having sharp cone-shaped points 13 coincident with and complemental to the said readily puncturable sections 6 in the said diaphragm 5. Similarly arranged and located in said front plate 7, is a series of tube-connection nozzles 13' carrying tubes 14 which lead to various predetermined parts of the engine or aircraft as diagrammatically shown in Figure 1.

Resisting the spring pressure upon the front plate 7, and normally holding the device inactive, is a link system which comprises preferably four inner links 15 each of which is pivoted in the base 3 by a pin 16. The two lower lnks 15 are each pivoted to an outer link 17, which outer links are in turn pivoted in the front plate 7 by pins 18.

The two upper inner links 15 are each pivoted to a bell-crank 19, the horizontal arm 20 of which is pivoted in the front plate 7 by a pin 21, while the vertical arms 22 of the bell-cranks carry a weight such as a ball 23.

Connecting these upper and lower series of links are vertical tie-links 24 pivoted on the link-pins 25, while pivotally connected to the vertical arm 22 of the bell-cranks 19 are manually operable rods 26, which pass through the fire-wall 2 of the aircraft and terminate in convenient position to the pilot, as diagrammatically shown in Figure 1.

Having thus described the invention, its operation is as follows:

The system being installed as shown, it remains inactive under all normal conditions. Should, however, a bad landing occur or the aircraft crash, such as would ordinarily cause a conflagration, the impulse of the shock in direction of the arrow (Figure 2) carries the link system out of normal position shown in Figure 2 into position shown in Figure 3. The pressure of the springs 11 on the front plate 7 being now unresisted by the link system, said front plate is pressed against the collapsible container 4 and exerts a steady collapsing pressure thereon. Simultaneously the sharp pointed ends 13 of the nozzles 12 and 13' pierce the readily puncturable sections 6 of the diaphragm 5, which action automatically connects each jet with the contents of the receptacle and causes the said contents to be discharged through said jets under pressure exerted on the collapsible container by the said springs 11.

A suitable fire extinguishing fluid such, for instance as carbon tetra-chloride is thus efficiently sprayed over the engine, and otherwise discharged to predetermined parts of the engine or aircraft through the tubes 14.

While the system is automatic in its action, the same may be rendered active at the will of the pilot at any time, by manual operation of the rods 26, to carry the link system into position shown in Figure 3.

Having thus fully described the invention, we do not wish to be understood as limiting ourselves to the exact construction herein set forth, as we consider ourselves clearly entitled to all such changes and modifications as fall within the limit and scope of the appended claims.

What we claim as new and desire to secure by Letters Patent of the United States is:

1. A device of the character described including a base, a front plate, a collapsible receptacle confined between said base and said front plate, a plurality of springs acting against said front plate and exerting pressure upon said front plate in the direction of said collapsible receptacle, a system of links and bell-cranks pivotally positioned between said base and said front plate to resist the pressure of said springs and normally hold the device in inactive position, a weight associated with said system of links and bell cranks to carry the same out of normal position, a manually operable rod for manually moving said system of links and bell cranks out of normal position, the said receptacle including a diaphragm having a series of readily puncturable portions, a series of jet nozzles disposed in said front plate, the nozzles having sharp points in line with the readily puncturable portions in the said diaphragm, and a series of tubes connecting with certain of said nozzles, the whole arranged whereby upon movement of said weight or said manually operable rod to carry said system of links and bell cranks out of normal position, the said springs move the said front plate into engagement with said receptacle to exert a collapsing pressure thereon and to simultaneously cause the said sharp points of the said nozzles to pierce the said diaphragm and establish connection between the contents of the receptacle and the said nozzles.

2. A device of the character described including a base, a front plate, a collapsible receptacle confined between said base and said front plate, means exerting pressure upon said front plate in the direction of said collapsible receptacle, means between said base and said front plate to resist the pressure on said front plate and normally hold the device in inactive position, shock actuated means and manually operable means connected with said pressure resisting means to move the same and permit movement of said front plate, said receptacle including a readily puncturable diaphragm, a series of sharp jet nozzles on said front plate disposed in front of said diaphragm, the whole arranged whereby upon movement of said front plate under influence of said pressure exerting means to collapse the said receptacle, the said nozzles will pierce the said diaphragm to establish connection between the contents of the receptacle and the said nozzles.

3. A device of the character described including a base, a front plate, a collapsible receptacle confined between said base and said front plate, means exerting pressure on said front plate in the direction of said collapsible receptacle, means for holding said front plate against movement by said pressure exerting means, means for actuating said holding means to relieve said front plate of the influence of said holding means to permit movement of said front plate against the said collapsible receptacle, said receptacle including a readily puncturable diaphragm, and a series of diaphragm piercing jet nozzles on said front plate, the whole arranged whereby upon movement of said front plate against the receptacle to collapse the same, the said nozzles will pierce the said diaphragm and establish connection between the contents of the receptacle and the said nozzles.

4. A device of the character described including a readily collapsible receptacle, means for exerting pressure on said receptacle to collapse the same, means for holding said pressure exerting means in inactive position, means for releasing said holding means to permit movement of said pressure exerting means against said receptacle to collapse the same, jet nozzles movable by said pressure exerting means for piercing said receptacle to establish connection between the contents of said receptacle and said nozzles.

5. A device of the character described including a readily collapsible receptacle, means for exerting pressure on said receptacle to collapse the same, means for holding said pressure exerting means in inactive position, means for releasing said holding means to permit movement of said pressure exerting means against said receptacle to collapse the same, and means movable by said pressure exerting means for piercing said receptacle to discharge the contents thereof.

6. A device of the character described including a readily collapsible and puncturable receptacle, inertia actuated means for collapsing and puncturing said receptacle, said puncturing means including means for spraying the contents of the receptacle.

In testimony whereof we affix our signatures.

CHARLES L. PAULUS.
ROBERT KAUCH.